D. R. VIVION.
CORN-PLANTERS.
No. 194,745.  Patented Aug. 28, 1877.
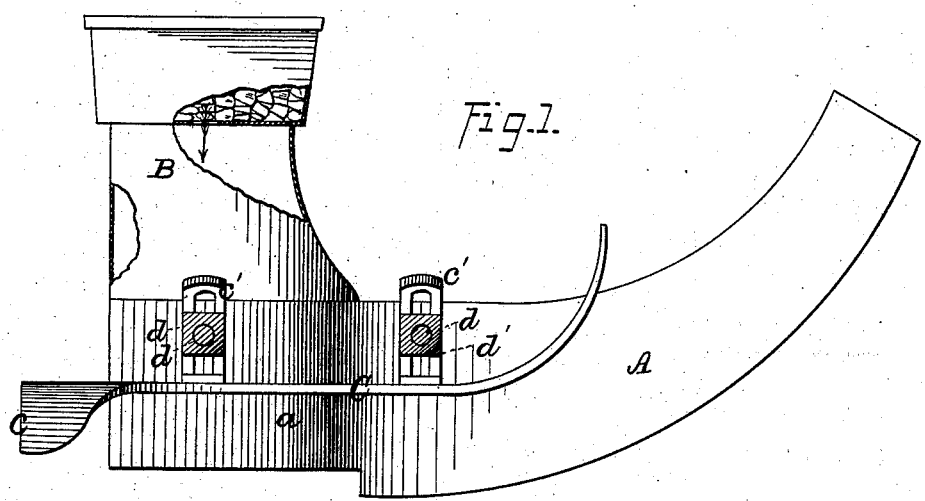
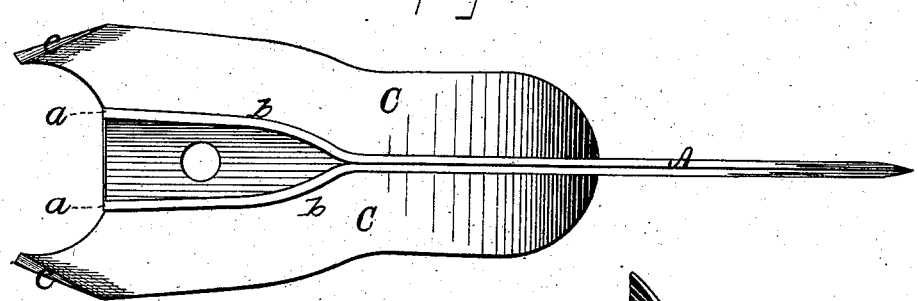
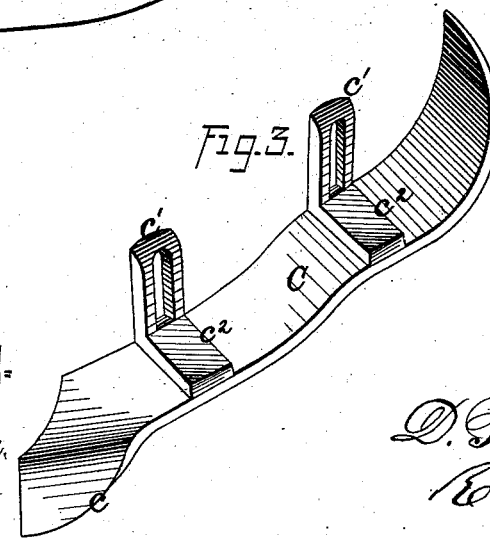
WITNESSES:
Jas. E. Hutchinson
J. W. Meister
INVENTOR:
D. R. Vivion
Redson Bro's
Attorneys

UNITED STATES PATENT OFFICE.

DAVID R. VIVION, OF McCREDIE, MISSOURI.

IMPROVEMENT IN CORN-PLANTERS.

Specification forming part of Letters Patent No. 194,745, dated August 28, 1877; application filed May 11, 1877.

*To all whom it may concern:*

Be it known that I, DAVID R. VIVION, of McCredie, in the county of Callaway and State of Missouri, have invented certain new and useful Improvements in Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a side elevation of my improved combined gage and hoe for corn-planters. Fig. 2 is an inverse view thereof; and Fig. 3 is a detached perspective view of one gage and hoe, there being two to a machine.

Corresponding parts in the several figures are denoted by like letters.

This invention relates to an improved combined gage and hoe for corn-planters, for regulating the depth of planting and covering the planted corn; and it consists of two horizontal gage-plates, formed at their rear ends with hoes, and disposed one upon each side of the opener; and, secondly, in their adjustability, substantially as hereinafter more fully set forth.

In the annexed drawing, A refers to the opener, expanded or bifurcated, as at $b$ $b$, to conform to the shape of the leg B in transverse section, and thus form a continuation of the leg secured thereon for depositing the corn in the ground. C C are two horizontal gage-plates, disposed one upon each side of the opener, and, preferably, curved upwardly at their forward ends, and thence extended and curved rearwardly along the expanded portion of the opener, a short distance beyond it. The said extended portions are bent downwardly, or provided with right-angular wings or hoes $c$ $c$ for covering the corn, the hoes throwing the plowed ground over the corn dropped into the furrow made by the opener. These plates themselves occupying a position at right angles to, or being disposed edgewise with, the opener, prevent the latter penetrating the plowed ground beyond their point of contact therewith; consequently, by raising or lowering the said gage-plates, the depth of planting will be gaged or regulated. To this end the plates C C are provided with slotted uprights $c^1$ $c^1$, preferably formed with right-angular portions $c^2$ $c^2$, through which may be inserted rivets entering the said plates for fastening them thereto. These slotted uprights or studs receive screws $d$ $d$ from the opener, which are provided with nuts $d'$ $d'$, by unscrewing and tightening which the vertical adjustment of the gage-plates can be attained.

Having thus described my invention, what I claim, and desire to secure by Letters Patent, is—

1. The gage-plates C C, having the right-angular wings or hoes $c$ $c$, in combination with and disposed edgewise to, and one upon either side of, the opener A, substantially as and for the purpose set forth.

2. The gage-plates C C, having the hoes or wings $c$ $c$, and slotted studs $c^1$ $c^1$, in combination with the opener A, having the screws and nuts $d$ $d'$, substantially as and for the purpose set forth.

In testimony that I claim the foregoing as my own I hereunto affix my signature in presence of two witnesses.

DAVID R. VIVION.

Witnesses:
JAMES RIDENBAUGH,
E. W. HOPKINS.